US012700775B2

(12) United States Patent
Dauth et al.

(10) Patent No.: US 12,700,775 B2
(45) Date of Patent: Aug. 4, 2026

(54) ASSEMBLY, DRIVE DEVICE

(71) Applicant: Robert Bosch GmbH, Stuttgart (DE)

(72) Inventors: Robert Alexander Dauth, Heilbronn
(DE); Benjamin Haufe, Obersulm
Willsbach (DE); Janos Tamas Csoti,
Erligheim (DE)

(73) Assignee: ROBERT BOSCH GMBH, Stuttgart
(DE)

( * ) Notice: Subject to any disclaimer, the term of this
patent is extended or adjusted under 35
U.S.C. 154(b) by 254 days.

(21) Appl. No.: 18/557,399

(22) PCT Filed: Aug. 10, 2022

(86) PCT No.: PCT/EP2022/072476
§ 371 (c)(1),
(2) Date: Oct. 26, 2023

(87) PCT Pub. No.: WO2023/020917
PCT Pub. Date: Feb. 23, 2023

(65) Prior Publication Data
US 2024/0213856 A1      Jun. 27, 2024

(30) Foreign Application Priority Data

Aug. 19, 2021    (DE) ..................... 10 2021 209 101.6

(51) Int. Cl.
H02K 11/00          (2016.01)
H01R 13/52          (2006.01)
H02K 11/21          (2016.01)
(52) U.S. Cl.
CPC ..... *H02K 11/0094* (2013.01); *H01R 13/5221*
(2013.01); *H02K 11/21* (2016.01); *H02K*
*2211/03* (2013.01)

(58) Field of Classification Search
CPC .......... H01R 13/5221; H02K 11/0094; H02K
11/21; H02K 2211/03; H02K 5/10; H02K
5/225; H02K 11/30
See application file for complete search history.

(56) References Cited

U.S. PATENT DOCUMENTS 10,742,087 B2 *  8/2020  Seshita .................... B60J 11/04
2002/0052141 A1   5/2002  Hattori et al.
(Continued)

FOREIGN PATENT DOCUMENTS

AT           247944 B   *   7/1966
CN        201438658 A       4/2010
(Continued)

OTHER PUBLICATIONS

AT-247944-B, all pages (Year: 1966).*
International Search Report for PCT/EP2022/072476. Issued Nov. 28, 2022.

*Primary Examiner* — Naishadh N Desai
(74) *Attorney, Agent, or Firm* — NORTON ROSE
FULBRIGHT US LLP

(57)          ABSTRACT

An assembly. The assembly includes a first element and a
second element, wherein the elements are fastened to one
another in such a way that they together enclose an assembly
interior, and wherein an electrically conductive cable pro-
trudes into the assembly interior through a cable passage
formed between the elements. For forming a particle seal
assigned to the cable passage, at least one of the elements
has at least one projection, which projects in the direction of
the other element and presses the cable against the other
element.

11 Claims, 4 Drawing Sheets

(56) References Cited

U.S. PATENT DOCUMENTS

| | | | |
|---|---|---|---|
| 2005/0269889 A1* | 12/2005 | Tessier ................. | H02K 5/1732 |
| | | | 310/90 |
| 2013/0028765 A1* | 1/2013 | Yokozawa .............. | F04D 13/06 |
| | | | 417/423.14 |
| 2019/0190351 A1* | 6/2019 | Gregorich .............. | H05K 1/181 |
| 2021/0363822 A1* | 11/2021 | Blair ................. | H02K 11/0094 |

FOREIGN PATENT DOCUMENTS

| | | |
|---|---|---|
| DE | 102015216684 A1 | 3/2017 |
| JP | S61157352 U | 9/1986 |
| JP | H11285194 A | 10/1999 |
| JP | 2003204176 A | 7/2003 |
| JP | 2020195195 A | 12/2020 |

* cited by examiner

ASSEMBLY, DRIVE DEVICE

FIELD

The present invention relates to an assembly, comprising a first element and a second element, wherein the elements are fastened to one another in such a way that they together enclose an assembly interior, and wherein an electrically conductive cable protrudes into the assembly interior through a cable passageway formed between the elements.

In addition, the present invention relates to a drive device, with such an assembly.

BACKGROUND INFORMATION

Assemblies of the general type mentioned above are described in the related art. For example, U.S. Patent Application Publication No. US 2002/052, 141 A1 describes an assembly formed as an electronics assembly that has a first element and a second element, wherein the elements are fastened to one another in such a way that they together enclose an assembly interior. An electrically conductive cable protrudes into the assembly interior through a cable passage formed between the elements. As a rule, a cable passage has a larger cross-section than the cable passing through the cable passage, such that the cross-section of the cable passage is only proportionally filled by the cable. Accordingly, particles can enter the assembly interior through the cable passage, which is undesirable. In order to prevent particles from penetrating through the cable passage, a sealing element, which is fastened to the cable and encloses the cable, is provided in the assembly described in U.S. Patent Application Publication No. US 2002/052, 141 A1.

SUMMARY

In an assembly according to an example embodiment of the present invention, at least one of the elements for forming a particle seal assigned to the cable passage has at least one projection, which projects in the direction of the other element and presses the cable against the other element. The particle seal retains at least certain particles, such as particles that exceed a threshold size. According to the present invention, the particle seal is assigned to the cable passage. In this respect, the particle seal prevents the retained particles from penetrating through the cable passage into the assembly interior. Compared with the above-described assembly, the solution according to the present invention can be implemented particularly cost-effectively. According to the present invention, at least one of the elements has at least one projection, which projects in the direction of the other element and presses the cable against the other element. For example, only the first element has at least one projection that projects in the direction of the second element and presses the cable against the second element. Alternatively, only the second element has at least one projection that projects in the direction of the first element and presses the cable against the first element. Alternatively, both elements each have at least one projection that projects in the direction of the other element and presses the cable against the other element. In particular, at least one of the elements has a plurality of projections that project in the direction of the other element and press the cable against the other element. A projection is understood to be a structure that stands out from an otherwise continuous course of the element having the projection. Preferably, the assembly interior is formed to be closed apart from the cable aperture. Alternatively, in addition to the cable passage, there is at least one further passage that connects the assembly interior with the assembly exterior. Preferably, the projection directly rests against the cable. Thus, there is a contact between the projection and the cable or an insulation of the cable, as the case may be.

According to an example embodiment of the present invention, preferably, the cable is formed as a ribbon cable. Such a design of the cable is advantageous, because when the cable is pressed against the other element, contact between the other element and the cable is achieved over a large area. This provides a particularly effective particle seal. Preferably, a width of the projection is greater than a width of the ribbon cable.

According to a preferred embodiment of the present invention, it is provided that the cable passage is bounded by a passage surface of the first element and a passage surface of the second element.

According to a preferred embodiment of the present invention, it is provided that the projection is arranged on the passage surface of the element and presses the cable against the passage surface of the other element. In such an arrangement of the projection, the element has the projection in the region of the cable passage. Accordingly, the cross-section of the cable passage is filled proportionally by the cable and also proportionally by the projection. The free cross-section of the cable passage is thus further reduced by the projection, which allows an effective particle seal to be obtained.

According to an alternative embodiment of the present invention, it is preferably provided that the projection is arranged on a surface of the element adjacent to the passage surface of the element and presses the cable against a surface of the other element adjacent to the passage surface of the other element. Accordingly, the element has the projection in a region adjacent to the cable passage. In this embodiment, the particle seal is then connected either upstream or downstream of the cable passage. This can also provide an effective particle seal. If the particle seal is connected upstream of the cable passage, the particle seal seals the cable passage from the assembly exterior. If the particle seal is connected downstream of the cable passage, the particle seal seals the assembly interior from the cable passage.

Furthermore, combinations of the alternative embodiments of the present described above are also possible. According to another embodiment of the present invention, it is provided that the projection is arranged on the passage surface of the element and presses the cable against the surface of the other element adjacent to the passage surface of the other element. According to another embodiment of the present invention, it is provided that the projection is arranged on the surface of the element adjacent to the passage surface of the element and presses the cable against the passage surface of the other element.

Preferably, according to an example embodiment of the present invention, the projection is preferably formed to be elastically deformable. This results in the advantage that production-related tolerances with regard to the first element and/or the second element can be compensated for by the projection.

According to an example embodiment of the present invention, preferably, the first element is a printed circuit board. Thus, the assembly interior is bounded proportionally by the printed circuit board. As a result, conductor paths and electronic components that are formed or arranged, as the case may be, on an end face of the printed circuit board facing the assembly interior are protected from particles by the particle seal. A sensor element is preferably arranged or formed, as the case may be, on an end face of the printed circuit board facing away from assembly interior. The assembly is then a sensor device. For example, the sensor element has at least one receiver coil that is formed as a conductor path on the printed circuit board. Preferably, the first element formed as a printed circuit board has the projection. However, the first element can also be formed as a printed circuit board without the first element having the projection.

According to a preferred embodiment of the present invention, it is provided that the particle seal is formed in such a way that it seals the assembly interior at least against particles that are larger than the smallest distance between adjacent conductor paths of the printed circuit board. Such a design of the particle seal retains at least the particles that could cause an electrical short circuit between the conductor paths. On the other hand, particles smaller than the smallest distance between adjacent conductor paths of the printed circuit board are harmless, at least with regard to an electrical short circuit.

According to an example embodiment of the present invention, preferably, the projection is an electrical component arranged on the printed circuit board. This design of the projection is advantageous because it is particularly easy to implement technically, for example by means of a particularly fully automated SMD assembly process. Preferably, the electrical component is functionless apart from its function with respect to the formation of the particle seal. According to a preferred embodiment of the present invention, it is provided that the electrical component is an electrical resistor or a capacitor.

According to an example embodiment of the present invention, preferably, the second element is a support element supporting the printed circuit board. Preferably, the second element formed as a support element has the projection. However, the second element can also be formed as a support element without the second element having the projection.

According to a preferred embodiment of the present invention, it is provided that the support element has the projection, and that the projection and a base body of the support element are made of the same material. This enables a particularly simple manufacture of the support element having the projection. Preferably, the material from which the support element and the projection are formed is a plastics material. Preferably, a base body of the support element and the projection are formed in one piece with one another, for example by injection molding. Preferably, a thickness of the projection is less than a thickness of the base body of the support element. In this way, despite the formation of the base body and the projection from the same material, it can be achieved that the base body is mechanically robust and the projection is elastically deformable.

According to a preferred embodiment of the present invention, it is provided that the support element has the projection, the projection is made of a first material, the base body of the support element is made of a second material, and the modulus of elasticity of the first material is less than the modulus of elasticity of the second material. As a result of this, too, a mechanically robust design of the support element and an elastically deformable formation of the projection can be achieved at the same time. Preferably, the first material and the second material are different plastics materials. Preferably, the base body of the support element and the projection are also formed in one piece with one another in this embodiment; for example the projection is molded onto the base body of the support element.

A drive device according an example embodiment of the present invention has an electric machine arranged in a housing with a rotatably mounted rotor and includes features of the assembly according to the present invention. This also results in the advantages already mentioned. Further preferred features and combinations of features result from what was described above and from the disclosure herein. Preferably, the assembly is arranged in the housing of the drive device, in particular in a manner fixed to the housing.

According to a preferred embodiment of the present invention, it is provided that the assembly has a sensor element and is formed to detect a rotational position of the rotor by means of the sensor element. The assembly is thus a sensor device. Preferably, the sensor element is arranged or formed, as the case may be, on the end face of the printed circuit board facing away from the assembly interior. Preferably, the printed circuit board is formed in the manner of a ring disk and is arranged coaxially with a drive shaft supporting the rotor.

The present invention is explained in more detail below with reference to the figures.

DETAILED DESCRIPTION OF EXAMPLE EMBODIMENTS

Figure 1:
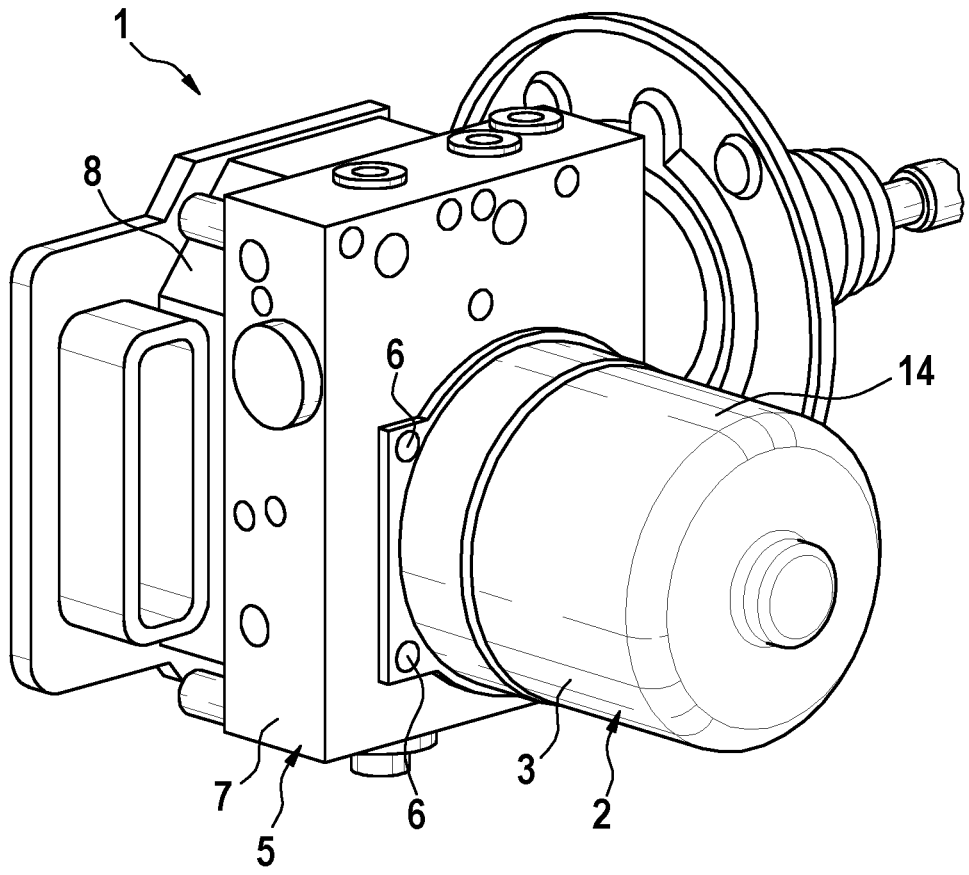
FIG. 1 is a perspective view of a pressure generator for a brake system, according to an example embodiment of the present invention.

FIG. 1 is a perspective view of a pressure generator 1 for a hydraulic brake system of a motor vehicle. The pressure generator 1 has an electric drive device 2. The drive device 2 has a housing 3, which in the present case has a circular cross-section. In addition, the drive device 2 has an electric machine 4. The electric machine 4 is arranged in the housing 3 and is therefore not visible in FIG. 1. As a working machine, the pressure generator 1 has a pump device 5 with at least one fluid pump. The housing 3 of the drive device 2 is fastened to a housing 7 of the pump device 5 by a plurality of fastening means 6. The drive device 2 is formed to actuate the at least one fluid pump of the pump device 5 by means of the electric machine 4. In addition, the pressure generator 1 has a control unit 8 for controlling the electric machine 4. The pump device 5 is arranged between the drive device 2 on one side and the control unit 8 on the other side.

Figure 2:
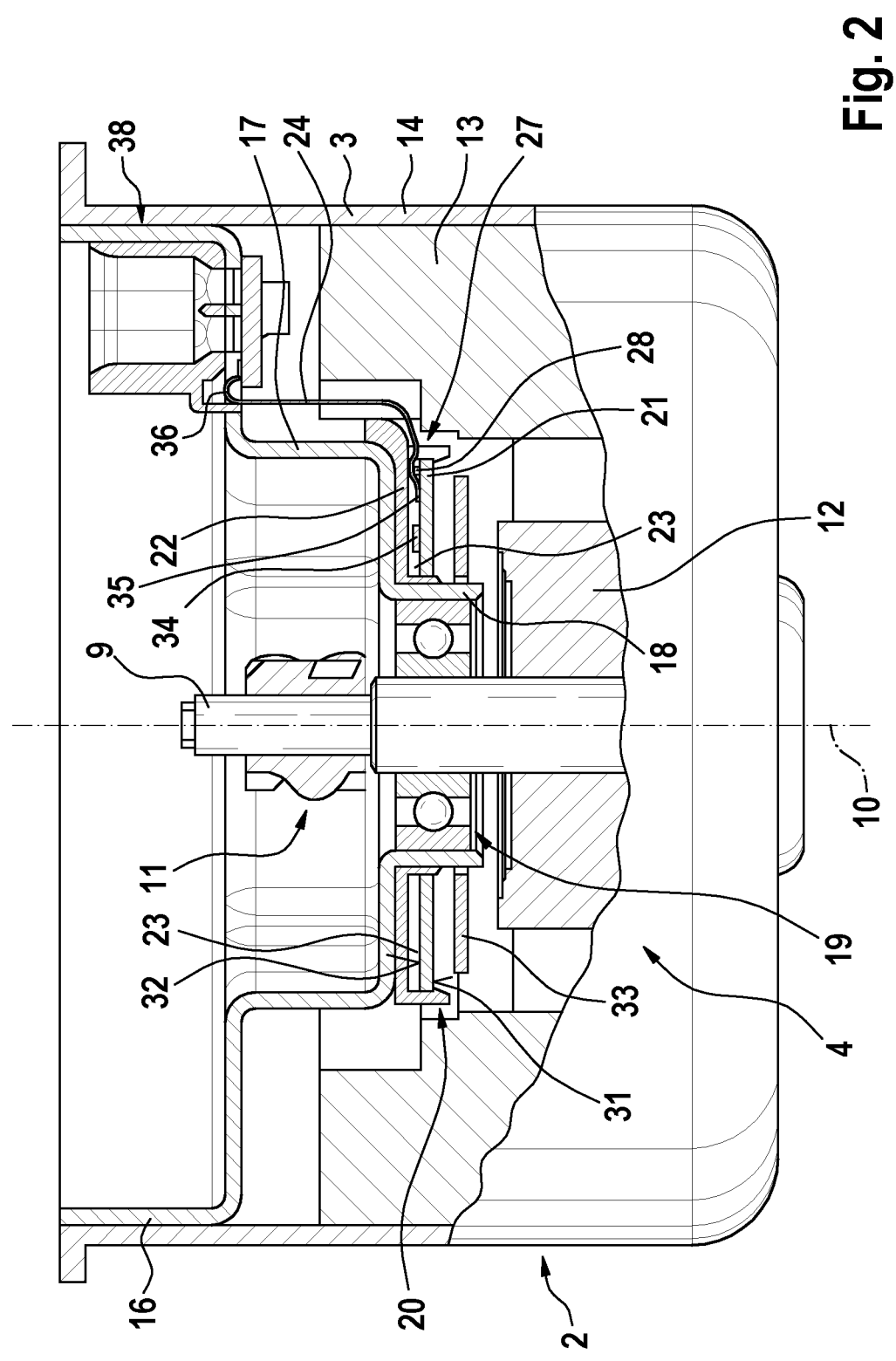
FIG. 2 is a sectional view of a drive device of the pressure generator, according to an example embodiment of the present invention.

FIG. 2 is a sectional view of the drive device 2. As can be seen from FIG. 2, the drive device 2 has a drive shaft 9, which is mounted in the housing 3 so that it can rotate about an axis of rotation 10. The drive shaft 9 is operatively connected to the at least one fluid pump of the pump device 5 by a gear device 11 that is only indicated.

The electric machine 4 has a rotor 12 arranged in a rotationally fixed manner on the drive shaft 9. The axis of rotation of the rotor 12 corresponds to the axis of rotation 10 of the drive shaft 9. The electric machine 4 also has a stator 13 arranged in a manner fixed to the housing. The stator 13 has a multiphase motor winding, not shown for reasons of clarity, which is arranged in a manner distributed around the rotor 12 in such a way that the rotor 12 and thus the drive shaft 9 can be rotated or driven, as the case may be, by a suitable current supply to the motor winding.

The housing 3 has a pole well 14 that supports the stator 13. As can be seen from FIG. 1, the pole well 14 is formed to be cup-shaped. The housing 3 also has a bearing shield 17. The bearing shield 17 covers the electrical machine 4 and in this respect forms a housing cover of the housing 3. The bearing shield 17 is formed to mount the drive shaft 9. For this purpose, the bearing shield 17 has a sleeve-shaped bearing section 18 extending in the axial direction. A rotary bearing 19 is arranged between the bearing section 18 and the drive shaft 9, which in the present case is a rolling element bearing 19. The bearing shield 17 also has a sleeve-shaped fastening section 16 extending in the axial direction. The bearing shield 17 is fastened to the pole well 14 by means of the fastening section 16, for example by a force-fit connection, by an adhesive connection, by a welded connection and/or by at least one fastening means.

Figure 3:
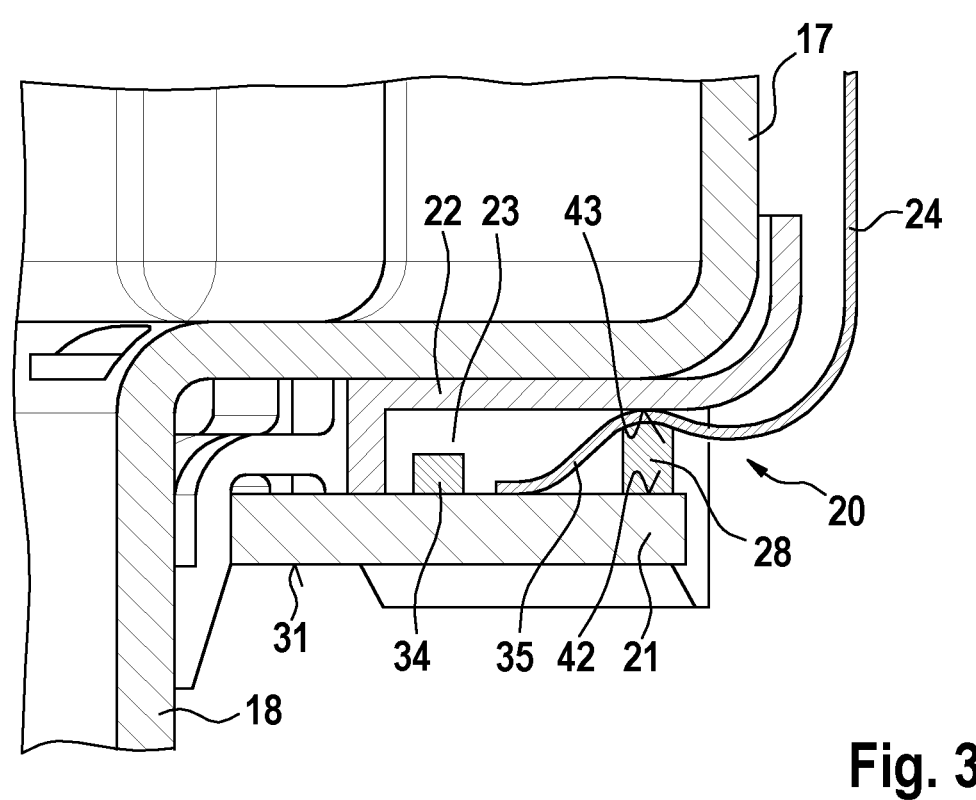
FIG. 3 is a detailed view of an assembly of the drive device, according to an example embodiment of the present invention.
Figure 4:
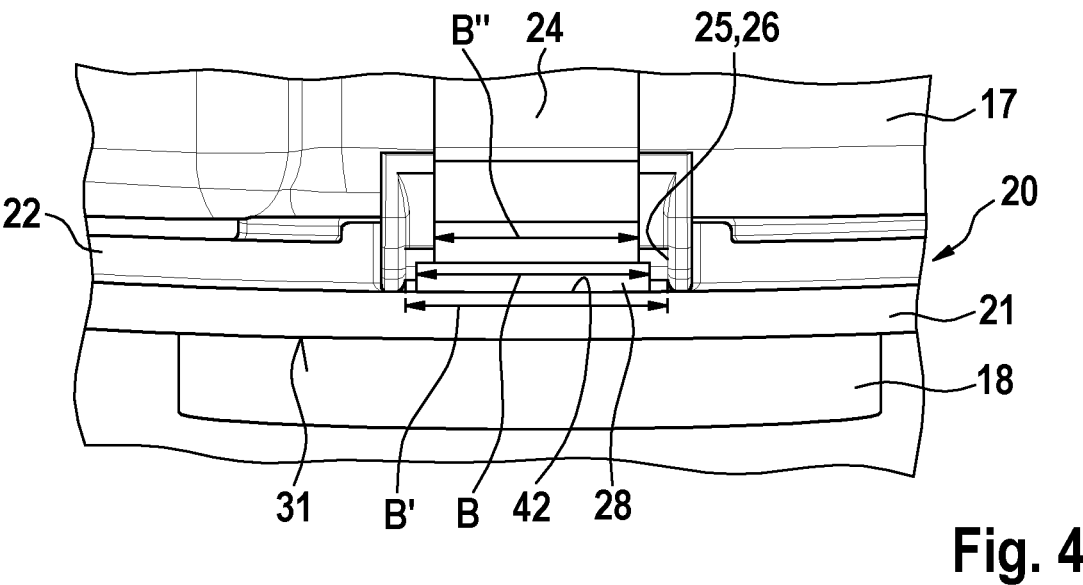
FIG. 4 is a further detailed view of the assembly, according to an example embodiment of the present invention.

The drive device 2 also has an assembly 20 that is arranged in the housing 3. FIGS. 3 and 4 each show a detailed view of the assembly 20. The assembly 20 has a first element 21 and a second element 22. The elements 21 and 22 are fastened to one another in such a way that they together enclose an assembly interior 23. In the present case, the first element 21 and the second element 22 are fastened to one another by a snap-in connection. Alternatively, the elements 21 and 22 are fastened to one another, for example, by an adhesive connection. The first element 21 and the second element 21 are formed in the manner of ring disks and are arranged coaxially with the drive shaft 9.

The assembly 20 also has an electrically conductive cable 24 that protrudes into the assembly interior 23 through a cable passage 25. In the present case, the cable 24 is a ribbon cable 24. The cable passage 25 is formed between the first element 21 and the second element 22. The cable passage 25 is bounded by a passage surface 42 of the first element 21 and a passage surface 43 of the second element 22. In the present case, the second element 22 has a recess 26 for forming the cable passage 25. Apart from the cable passage 25, the assembly interior 23 is closed according to the present exemplary embodiment. As can be seen from FIGS. 2, 3 and 4, the cable passage 25 has a larger cross-section than the cable 24, such that the cable 24 does not completely fill the cross-section of the cable passage 25.

A particle seal 27 is assigned to the cable passage 25 to seal the assembly interior 23 from particles. A projection 28 is provided to form the particle seal 27. According to the exemplary embodiment shown in FIGS. 2, 3 and 4, the first element 21 has the projection 28. In the present case, the projection 28 is arranged on the passage surface 42 of the first element 21. The projection 28 projects from the first element 21 in the direction of the second element 22 and presses the cable 24 against the second element 22. Alternatively, the second element 22 has the projection 28, wherein the projection 28 projects in the direction of the first element 21 and presses the cable 24 against the first element 21.

In the present case, the first element 21 is a printed circuit board 21. By means of the second element 22, the assembly

20 is fastened to the bearing shield 17. Accordingly, the assembly 20 is arranged in a manner fixed to the housing. Thus, the second element 22 supports the printed circuit board 21, such that the second element 22 is a support element 22 in the present case. The support element 22 is made of a plastics material.

The printed circuit board 21 has a first end face 31 and a second end face 32. The first end face 31 faces the rotor 12 and lies axially opposite the rotor 12 or a measuring sensor 33 that is coupled to the rotor 12 in a rotationally fixed manner, as the case may be. A sensor element is arranged on the first end face 31. The assembly 20 is formed to detect a rotational position of the rotor 12 by means of the sensor element. Accordingly, the assembly 20 is formed as a sensor device 20. In the present case, the assembly 20 is formed as an inductive sensor. For this purpose, the sensor element has at least one transmitter coil and at least one receiver coil, wherein the coils are formed as conductor paths on the first end face 32 of the printed circuit board 21. The second end face 32 faces the assembly interior 23. An electronic component 34 is arranged on the second end face 32. In the present case, the electronic component 34 is an application-specific integrated circuit (ASIC). The electronic component 34 is formed to demodulate the sensor signal of the sensor element.

A first end section 35 of the cable 24 projecting into the assembly interior 23 is electrically connected to the printed circuit board 21. A second end section 36 of the cable 24 is electrically connected to a connection device 38. If the drive device 2 is installed in the pressure generator 1 as shown in FIG. 1, the connection device 38 is electrically connected to the control unit 8.

According to the exemplary embodiment shown in FIGS. 2, 3 and 4, the projection 28 is an electrical component 28 arranged on the printed circuit board 21. For example, the component 28 is an electrical resistor 28 or a capacitor 28. Preferably, the electrical component 28 is functionless apart from its function with respect to the formation of the particle seal 27.

The particle seal 27 is preferably formed in such a way that it seals the assembly interior 23 is at least with respect to particles that are larger than the smallest distance between adjacent conductor paths of the printed circuit board 21. This is achieved in particular by the dimensions of the projection 28. As can be seen from FIG. 4, a width B of the projection 28 is only slightly smaller than a width B' of the cable passage 25. It follows that the free cross-section of the cable passage 25 is so small that it cannot be overcome by particles larger than the smallest distance between adjacent conductor paths of the printed circuit board 21. In the present case, the width B of the projection 28 is greater than a width B" of the cable 24.

Figure 5:
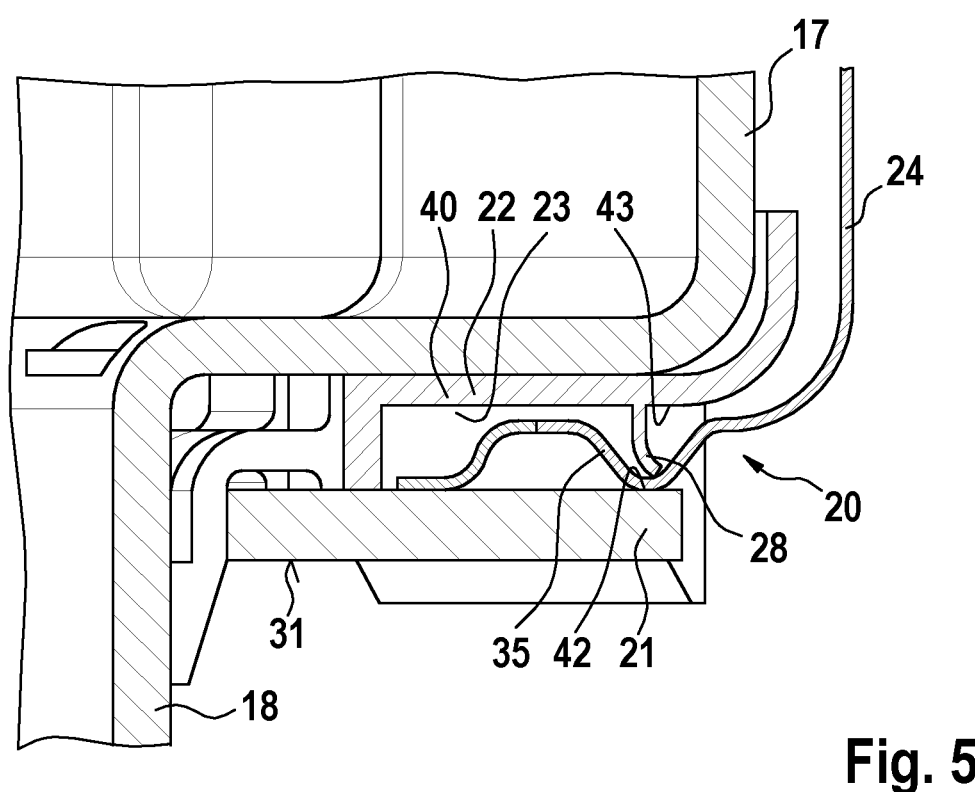
FIG. 5 shows a further exemplary embodiment of the assembly according to the present invention.

FIG. 5 shows the assembly 20 according to a further exemplary embodiment. The exemplary embodiment shown in FIG. 5 differs from the exemplary embodiment shown in FIGS. 2, 3 and 4 substantially with respect to the configuration of the projection 28. In the exemplary embodiment shown in FIG. 5, the support element 22 has the projection 28. The projection 28 is arranged on a base body 40 of the support element 22. The base body 40 and the projection 28 are formed together as an injection molded part. In this case, the projection 28 and the base body 40 are made of the same material or plastics material, as the case may be. To increase an elastic deformability of the projection 28, the projection 28 has a smaller thickness than the base body 40. The projection 28 projects in the direction of the printed circuit board 21 and presses the cable 24 against the second end face 25 of the printed circuit board 21. As a result, a force acts on the projection 28, which in the present case causes the projection 28 to be elastically bent. In the present case, the projection 28 is arranged on the passage surface 43 of the support element 22 and presses the cable 24 against the passage surface 42 of the printed circuit board 21.

Figure 6:
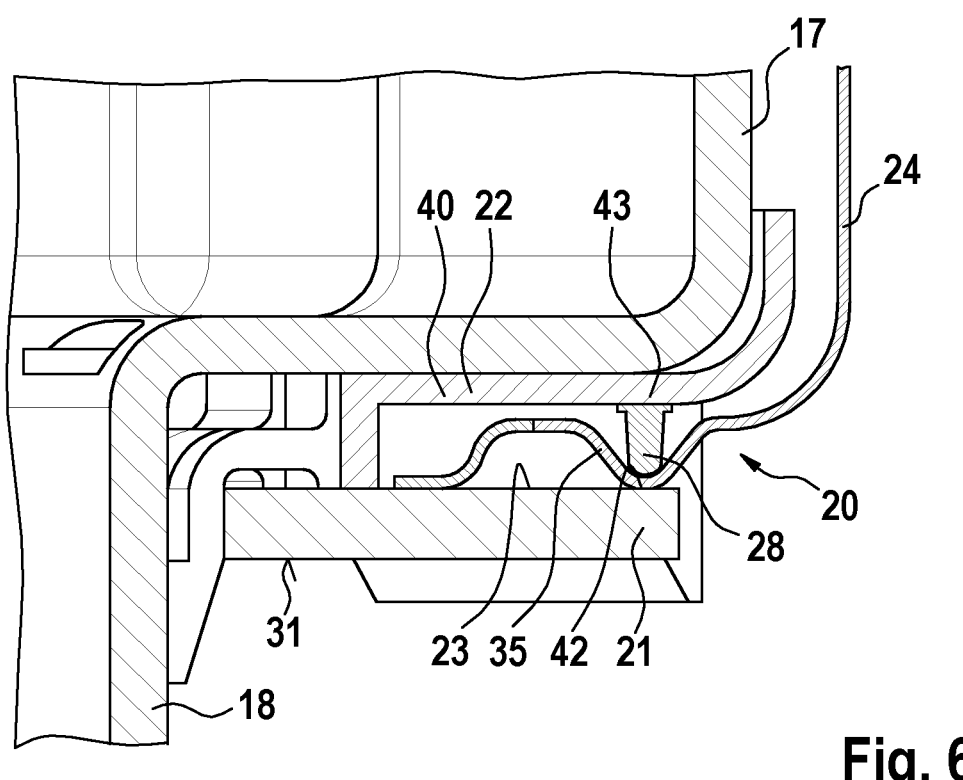
FIG. 6 shows a further exemplary embodiment of the assembly according to the present invention.

FIG. 6 shows the assembly 20 according to a further exemplary embodiment. The exemplary embodiment shown in FIG. 6 differs from the exemplary embodiment shown in FIG. 5 with respect to the configuration of the projection 28. Moreover, in the exemplary embodiment shown in FIG. 6, the support element 22 has the projection 28 that projects in the direction of the printed circuit board 21 and presses the cable 24 against the printed circuit board 21. However, in the exemplary embodiment shown in FIG. 6, the base body 40 and the projection 28 are made of different plastics materials. The projection 28 is made of a first plastics material. The base body 40 is made of a second plastics material. To increase the elastic deformability of the projection 28, the modulus of elasticity of the first plastics material is smaller than the modulus of elasticity of the second plastics material. Preferably, the projection 28 is molded onto the base body 40.

The invention claimed is:

1. An assembly, comprising:
   a first element and a second element fastened to one another in such a way that they together enclose an assembly interior, wherein an electrically conductive cable protrudes into the assembly interior through a cable passage formed between the first and second elements, wherein, for forming a particle seal assigned to the cable passage, at least one element of the first and second elements has at least one projection which projects in a direction of the other element of the first and second elements and presses the cable against the other element, wherein:
   the first element is a printed circuit board,
   the second element is a support element supporting the printed circuit board, and
   the support element has the projection, the projection is made of a first material, a base body of the support element is made of a second material, and a modulus of elasticity of the first material is less than a modulus of elasticity of the second material.

2. The assembly according to claim 1, wherein the cable is a ribbon cable.

3. The assembly according to claim 1, wherein the cable passage is bounded by a passage surface of the first element and a passage surface of the second element.

4. The assembly according to claim 3, wherein the projection is arranged on the passage surface of the element and presses the cable against the passage surface of the other element.

5. The assembly according to claim 3, wherein the projection is arranged on a surface of the element adjacent to the passage surface of the element and presses the cable against a surface of the other element adjacent to the passage surface of the other element.

6. The assembly according to claim 1, wherein the projection is elastically deformable.

7. The assembly according to claim 1, wherein the particle seal is formed in such a way that it seals the assembly interior at least with respect to particles that are larger than a smallest distance between adjacent conductor paths of the printed circuit board.

8. The assembly according to claim 1, wherein the projection is an electrical component arranged on the printed circuit board.

9. The assembly according to claim 1, wherein the support element has the projection, and the projection and a base body of the support element are made of the same material.

10. A drive device, comprising:
    an electric machine arranged in a housing, which has a rotatably mounted rotor; and
    an assembly including:
    a first element and a second element fastened to one another in such a way that they together enclose an assembly interior, wherein an electrically conductive cable protrudes into the assembly interior through a cable passage formed between the first and second elements, wherein, for forming a particle seal assigned to the cable passage, at least one element of the first and second elements has at least one projection which projects in a direction of the other element of the first and second elements and presses the cable against the other element, wherein:
    the first element is a printed circuit board,
    the second element is a support element supporting the printed circuit board, and
    the support element has the projection, the projection is made of a first material, a base body of the support element is made of a second material, and a modulus of elasticity of the first material is less than a modulus of elasticity of the second material.

11. The drive device according to claim 10, wherein the assembly has a sensor element and is formed to detect a rotational position of the rotor using the sensor element.

* * * * *